(12) United States Patent
Sato et al.

(10) Patent No.: US 9,716,803 B2
(45) Date of Patent: Jul. 25, 2017

(54) READING DEVICE CONFIGURED TO READ ORIGINAL DOCUMENT PLACED ON PLATEN

(71) Applicant: Brother Kogyo Kabushiki Kaisha, Nagoya-shi, Aichi-ken (JP)

(72) Inventors: Seiya Sato, Inabe-gun (JP); Koji Yamada, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/079,286

(22) Filed: Mar. 24, 2016

(65) Prior Publication Data

US 2016/0323466 A1 Nov. 3, 2016

(30) Foreign Application Priority Data

Apr. 30, 2015 (JP) ................. 2015-092665

(51) Int. Cl.
*H04N 1/04* (2006.01)
*H04N 1/00* (2006.01)
*H04N 1/10* (2006.01)
*H04N 1/028* (2006.01)

(52) U.S. Cl.
CPC ..... *H04N 1/00713* (2013.01); *H04N 1/00737* (2013.01); *H04N 1/00795* (2013.01); *H04N 1/0281* (2013.01); *H04N 1/1061* (2013.01); *H04N 2201/0094* (2013.01)

(58) Field of Classification Search
CPC .......... H04N 1/00713; H04N 1/00737; H04N 1/00795; H04N 1/0281; H04N 1/1061; H04N 2201/0094

USPC .......... 358/488, 486, 497
See application file for complete search history.

(56) References Cited

U.S. PATENT DOCUMENTS

| | | | | |
|---|---|---|---|---|
| 6,952,290 B2 * | 10/2005 | Ishido | ............... | H04N 1/00681 250/208.1 |
| 2003/0178585 A1 * | 9/2003 | Tseng | ................. | H04N 1/00681 250/559.24 |
| 2004/0174572 A1 * | 9/2004 | Park | .................... | H04N 1/0071 358/474 |

(Continued)

FOREIGN PATENT DOCUMENTS

| | | |
|---|---|---|
| JP | H05-207239 A | 8/1993 |
| JP | 3168666 B2 | 5/2001 |
| JP | 2005-017809 A | 1/2005 |

*Primary Examiner* — Cheukfan Lee
(74) *Attorney, Agent, or Firm* — Banner & Witcoff, Ltd.

(57) ABSTRACT

A reading device includes a platen; a cover; a reading unit; and a controller. The platen includes first and second reference points. The controller is configured to: control the reading unit to read one line worth of data in a main scanning direction when the cover is moved from an open position to a close position with an original document being placed on the platen, the one line including the first and second reference points; determine whether the first reference point is overlaid with the original document; in response to determining that the first reference point is overlaid with the original document, determine a first length of the original document in the main scanning direction based on the one line worth of data; specify a particular size of the original document such that the first length is a short side length of a prefixed sheet in the particular size.

10 Claims, 6 Drawing Sheets

(56) References Cited

U.S. PATENT DOCUMENTS

| | | | |
|---|---|---|---|
| 2004/0190089 A1* | 9/2004 | Tsutsumi | H04N 1/00681 358/505 |
| 2005/0111894 A1* | 5/2005 | Hosoi | G03G 15/607 399/371 |
| 2010/0103480 A1* | 4/2010 | Kim | H04N 1/00681 358/474 |

* cited by examiner

READING DEVICE CONFIGURED TO READ ORIGINAL DOCUMENT PLACED ON PLATEN

CROSS REFERENCE TO RELATED APPLICATION

This application claims priority from Japanese Patent Application No. 2015-092665 filed Apr. 30, 2015. The entire content of the priority application is incorporated herein by reference.

TECHNICAL FIELD

The present disclosure relates to a reading device.

BACKGROUND

Generally, a reading device detects a size of an original document to be read, sets a region of the detected document size as a reading range, and reads the original document.

A reading device known in the art determines a document size of an original document using a scanner which moves in a moving direction and detects a document width of the original document at a home position provided with a predetermined interval from a leading edge of the original document in the moving direction and a sensor which detects a document length of the original document.

SUMMARY

However, since the conventional reading device described above determines the document size using the scanner and the sensor, a signal from the scanner as well as a signal from the sensor is necessarily processed. Therefore, the signal processing is complicated.

In view of the foregoing, it is an object of the disclosure to provide a reading device capable of determining the document size without providing the sensor for detecting the document length.

In order to attain the above and other objects, one aspect provides a reading device that includes a platen; a cover; a reading unit; and a controller. The platen includes a first reference point, a second reference point, and a third reference point. The cover is movable between an open position and a close position. The platen is exposed when the cover is at the open position. The platen is covered by the cover when the cover is at the close position. The reading unit is configured to read an original document placed on the platen on a line-to-line basis in a main scanning direction while the reading unit is moving in a sub-scanning direction. The controller is configured to: (a) control the reading unit to read one line worth of data in the main scanning direction when the cover is moved from the open position to the close position with the original document being placed on the platen, the one line including the first reference point and the second reference point; (b) determine whether or not the first reference point is overlaid with the original document; (c) in response to determining in (b) that the first reference point is overlaid with the original document, determine a first length of the original document in the main scanning direction based on the one line worth of data read by the reading unit; (d) specify a particular size of the original document such that the first length is a short side length of a prefixed sheet in the particular size; and (e) control the reading unit to read a range of the particular size of the original document.

According to another aspect, another aspect provides a reading device that includes a platen; a cover; a reading unit; and a controller. The platen includes a first reference point, a second reference point, and a third reference point. The cover is movable between an open position and a close position. The platen is exposed when the cover is at the open position. The platen is covered by the cover when the cover is at the close position. The reading unit is configured to read an original document placed on the platen on a line-to-line basis in a main scanning direction while the reading unit is moving in a sub-scanning direction. The controller is configured to: (a) control the reading unit to read one line worth of data in the main scanning direction when the cover is moved from the open position to the close position with the original document being placed on the platen, the one line including the first reference point and the second reference point; (b) determine whether or not the first reference point is overlaid with the original document; (c) in response to determining in (b) that the first reference point is overlaid with the original document, determine a first length of the original document in the main scanning direction based on the one line worth of data read by the reading unit; (d) specify a particular size of the original document such that the first length is a long side length of a prefixed sheet in the particular size; and (e) control the reading unit to read a range of the particular size of the original document.

BRIEF DESCRIPTION OF THE DRAWINGS

The particular features and advantages of the disclosure as well as other objects will become apparent from the following description taken in connection with the accompanying drawings, in which:

FIGS. 1A and 1B each illustrates a configuration of a reading device according to an embodiment of the present disclosure.

DETAILED DESCRIPTION

A reading device according to embodiment will be described while referring to the accompanying drawings wherein like parts and components are designated by the same reference numerals to avoid duplicating description.

Figure 1A:
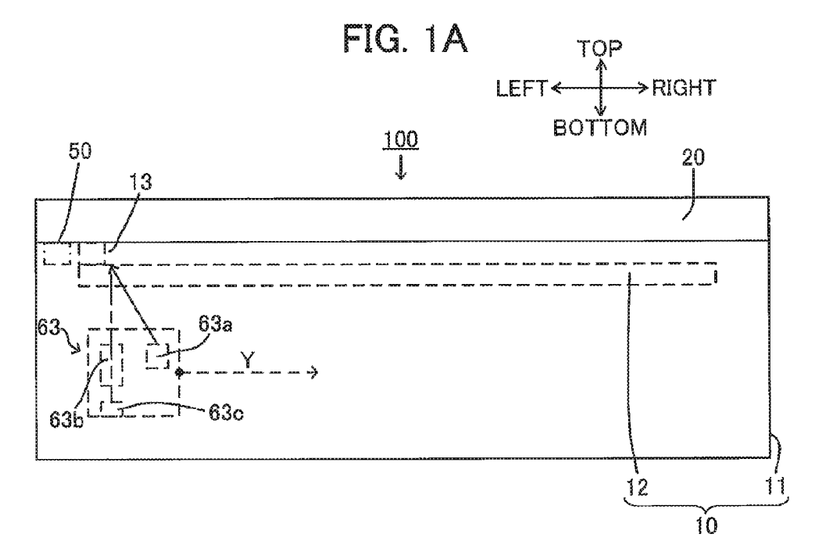
FIG. 1A is a front view including a partial cross sectional view of the reading device and FIG. 1B is a plan view of a transparent plate of the reading device.
Figure 1B:
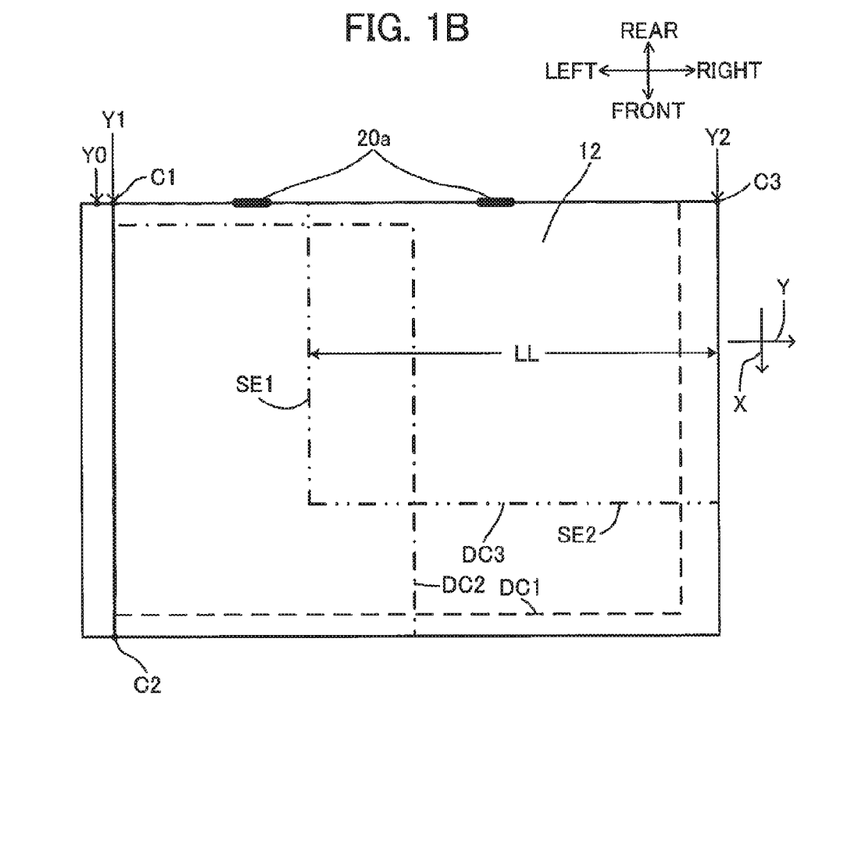

In the following description, a top side of the device in FIG. 1 is defined as the "top side," the bottom side as the "bottom side," the near side as the "front side" and the far side as the "rear side." Further, a right side is defined as the "right side," and the left side as the "left side."

FIG. 1A is a front view of a reading device 100. The reading device 100 includes a document table 10 and a cover 20. The document table 10 includes a main body 11 and a transparent plate 12. The main body 11 is a housing for containing various members (for example, the transparent plate 12, a reading unit 63, a cover sensor 50, and the like). The transparent plate 12 is contained in the main body 11, and fixed to the main body 11. An original document DC to be read is placed on the transparent plate 12. The cover 20 is disposed in an upper portion of the main body 11, and is openable and closable with respect to the main body 11. The cover 20 includes a pivot shaft 20a on the rear side of the main body 11 (the far side of the main body 11 in FIG. 1A), and is opened/closed from the front side. In other words, the cover 20 includes the pivot shaft 20a on a side near a first reference corner C1 described later, and is opened/closed from a side near a second reference corner C2 described later. The bottom surface of the cover 20 (that is, the surface of the cover 20 on a side near the transparent plate 12) is white in color. The cover sensor 50 is disposed in the main body 11, and configured to vary output level according to the open/close state of the cover 20. Specifically, in a case where an angle formed between the cover 20 and the main body 11 is larger than 10 degrees, the cover sensor 50 comes to an ON state, and in the case of 10degrees or less, the cover sensor 50 comes to an OFF state.

The reading device 100 further includes the reading unit 63 which is contained in the main body 11 below the transparent plate 12. The reading unit 63 is movable along a sub-scanning direction (a direction indicated by an arrow Y in FIG. 1A, that is, a right-left direction) with respect to the main body 11. The reading unit 63 reads the original document DC placed on the transparent plate 12. The reading unit 63 is configured of a contact image sensor (CIS), and specifically includes a light source 63a, a rod lens 63b, and an image sensor 63c. The light source 63a irradiates light toward the original document DC on the transparent plate 12. Light irradiated from the light source 63a is reflected off the original document DC and passes through the rod lens 63b to be received by the image sensor 63c. More specifically, the image sensor 63c is configured of a plurality of optical elements (not shown) arranged along a main scanning direction (a direction perpendicular to the sheet of FIG. 1A, that is, the front-rear direction). In other words, the image sensor 63c is a line sensor that reads the original document DC on a line-to-line basis in the main scanning direction, i.e., the direction in which a plurality of optical elements is arranged. In the following description, a position in the sub-scanning direction at which the image sensor 63c is provided will be called a "reading position."

FIG. 1B is a plan view of the transparent plate 12. The transparent plate 12 has an upper surface which is exposed toward the cover 20. The upper surface of the transparent plate 12 is formed in a rectangular shape having a long side extending in the sub-scanning direction Y and a short side extending in the main scanning direction X. The original document DC to be read is placed on the upper surface of the transparent plate 12. The first reference corner C1 at which one vertex of an original document DC to be read is allocable is provided at the end portion on the upstream side of the main scanning direction X and on the upstream side of the sub-scanning direction Y (that is, the upper left corner of FIG. 1B) in the upper surface of the transparent plate 12. The second reference corner C2 at which one vertex of an original document DC to be read is allocable is provided in the end portion on the downstream side of the main scanning direction X and on the upstream side of the sub-scanning direction Y (that is, the lower left corner of FIG. 1B) in the upper surface of the transparent plate 12. A third reference corner C3 at which one vertex of an original document DC to be read is allocable is provided in the end portion on the upstream side of the main scanning direction X and on the downstream side of the sub-scanning direction Y (that is, the upper right corner of FIG. 1B) in the upper surface of the transparent plate 12. In the following description, a position corresponding to the first reference corner C1 and the second reference corner C2 in the sub-scanning direction Y is called a "first standby position Y1," and a position corresponding to the third reference corner in the sub-scanning direction Y is called a "second standby position Y2." Further, the transparent plate 12 is formed to have an original document DC of an A3 size as a maximum size of an original document available to place. Herein, among each side of an original document DC, a side which is parallel to the sub-scanning direction Y and positioned on the upstream side of the main scanning direction X is set as an upper side, a side which is parallel to the sub-scanning direction Y and positioned on the downstream side of the main scanning direction X is set as a lower side, a side which is parallel to the main scanning direction X and positioned on the upstream side of the sub-scanning direction Y is set as a left side, and a side which is parallel to the main scanning direction X and positioned on the downstream side of the sub-scanning direction Y is set as a right side.

A state where an original document DC is placed on the transparent plate 12 will be described with reference to FIG. 1B. An original document DC of an A3 size which is placed in a landscape orientation (laterally placed state) is called a lateral A3 original document DC1 and depicted by a broken line in FIG. 1B. The lateral A3 original document DC1 depicted by the broken line is placed with respect to the first reference corner C1. An original document DC of an A4 size which is placed in a portrait orientation (longitudinally placed state) is called a longitudinal A4 original document DC2 and depicted by a chain line in FIG. 1B. The longitudinal A4 original document DC2 depicted by the chain line is placed with respect to the second reference corner C2. An original document DC of an A4 size which is placed in a landscape orientation (laterally placed state) is called a lateral A4 original document DC3 and depicted by a two-dotted chain line. The lateral A4 original document DC3 depicted by the two-dotted chain line is placed with respect to the third reference corner C3. The "landscape orientation" is a state in which the original document DC is placed on the transparent plate 12 such that the long sides of the original document DC are along the long sides of the upper surface of the transparent plate 12 and the short sides of the original document DC are along the short sides of the upper surface of the transparent plate 12. The "longitudinally placed state" is a state in which the original document DC is placed on the transparent plate 12 such that the short sides of the original document DC are along the long sides of the upper surface of the transparent plate 12 and the long sides of the original document DC are along the short sides of the upper surface of the transparent plate 12. The reading device 100 in the present embodiment is configured to perform reading by assuming that the original document DC is placed in the laterally placed state when placed with respect to the first reference corner C1, and that the original document DC is placed in the longitudinally placed state when placed with respect to the second reference corner C2. Further, the reading device 100 is configured to perform region specification reading in which a partial rectangular region of the original document DC is selected by a user using the reading device 100 when the original document DC is placed with respect to the third reference corner C3.

The reading device 100 further includes a reference member 13 fixed to the upper surface of the transparent plate 12. The reference member 13 is provided in the end portion on the upstream side of the sub-scanning direction Y of the transparent plate 12 (that is, the left side of FIG. 1B). The reference member 13 is white in color, extends in the main scanning direction X, and is used for acquiring white data WT described later. In the following description, a position at which the reference member 13 is provided in the sub-scanning direction Y is called a "home position Y0." The reading unit 63 moves in the sub-scanning direction Y with respect to the home position Y0.

Figure 2:
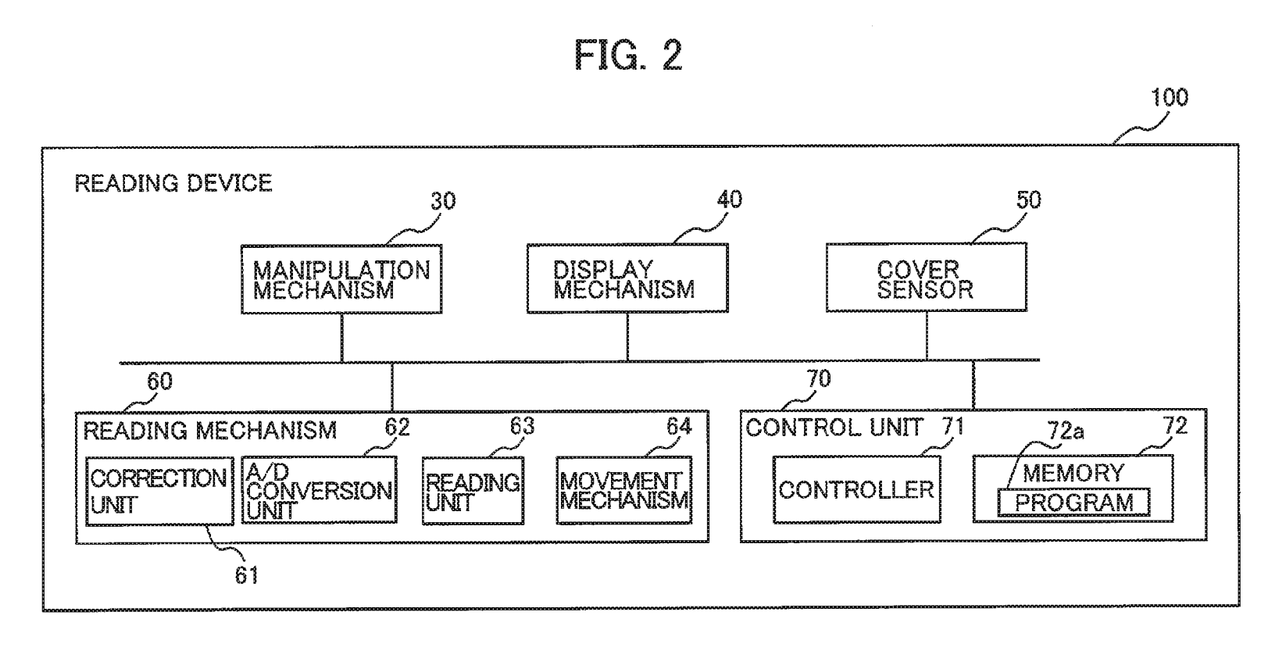
FIG. 2 illustrates a control configuration of the reading device.

FIG. 2 illustrates a control configuration of the reading device 100. The reading device 100 further includes a manipulation mechanism 30, a display mechanism 40, the cover sensor 50, a reading mechanism 60, and a control unit 70. The manipulation mechanism 30 is configured of a plurality of keys such as a start button. Various commands can be input to the reading device 100 through manipulating the manipulation mechanism 30 by the user. The display mechanism 40 is a display for displaying various types of information. The cover sensor 50 is configured to vary output level according to the open/close state of the cover 20. The control unit 70 includes a controller 71 and a memory 72. The controller 71 is a processor which performs various processes (for example, processes of FIGS. 3 to 6 described later) according to a program 72a stored in the memory 72.

The reading mechanism 60 includes the reading unit 63, a movement mechanism 64, an A/D conversion unit 62, and a correction unit 61. The movement mechanism 64 controls the reading unit 63 to move in the sub-scanning direction Y. The A/D conversion unit 62 converts analog data output from the reading unit 63 into digital data. The correction unit 61 performs shading compensation on the digital data converted by the A/D conversion unit 62 using white data WT and black data BK described later into a gradation value. Herein, the digital data converted in the A/D conversion unit 62 can be output to the memory 72, and also can be output to the correction unit 61. The digital data output to the memory 72 is stored in the memory 72. The gradation value converted by the correction unit 61 is output to the memory 72 and stored in the memory 72.

Figure 3:
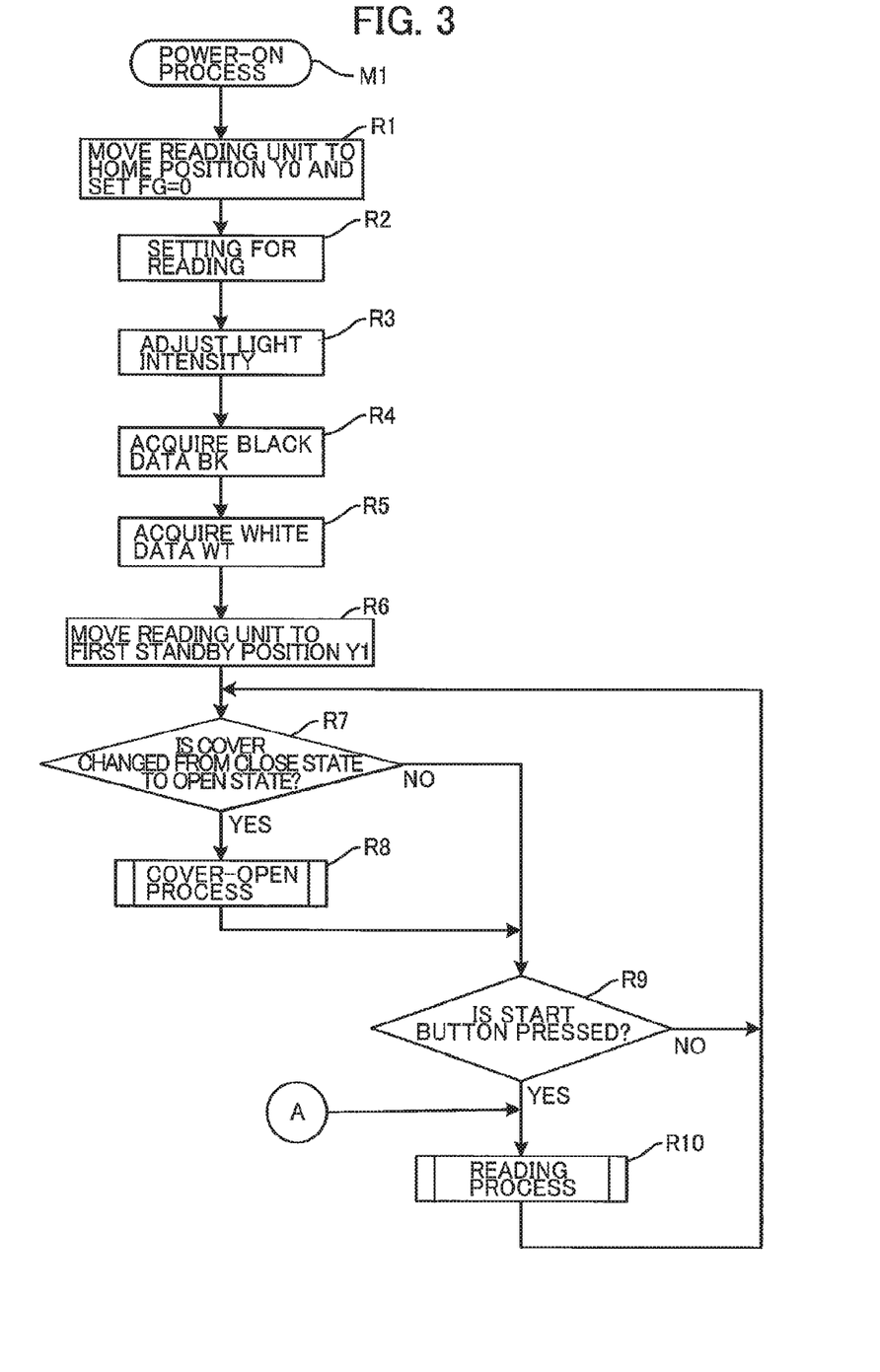
FIG. 3 is a flowchart illustrating steps in a power-on process executed by the reading device.

Subsequently, a power-on process (M1) performed by the controller 71 will be described with reference to FIG. 3. When the power of the reading device 100 is turned on, the controller 71 starts the power-on process (M1) of FIG. 3.

When the power-on process (M1) is started, the controller 71 controls the movement mechanism 64 to move the reading unit 63. The controller 71 changes the reading position from the position at the time of turning off the power of the reading device 100 to the home position Y0, and sets 0 to a position flag FG (R1). Thus, the reading position of the reading unit 63 (that is, the position of the image sensor 63c) is matched with the position of the reference member 13 in the sub-scanning direction Y. Herein, the position flag FG is a storage area in the memory 72 that stores data indicating a position of the original document DC placed on the transparent plate 12. In the present embodiment, any one of numerical values 0, 1, 2 is set to the position flag FG. The controller 71 sets 0 to the position flag FG at the initial time of the reading device 100 (R1).

The controller 71 performs setting for reading (R2). Specifically, the controller 71 sets the position corresponding to the first reference corner C1 in the main scanning direction X to the A/D conversion unit 62 as a reading start pixel position X1. Further, the controller 71 sets a position corresponding to the second reference corner C2 in the main scanning direction X to the A/D conversion unit 62 as a reading end pixel position X2. Herein, the expression "the position corresponding to the first reference corner C1" means a position slightly shifted to the inside of the original document from the position of the first reference corner C1 in the main scanning direction X (for example, a position shifted by 3 mm to the inside from the first reference corner C1). The expression "the position corresponding to the second reference corner C2" means a position slightly shifted to the inside of the original document from the position of the second reference corner C2 in the main scanning direction X (for example, a position shifted by 3 mm to the inside from the second reference corner C2).

The controller 71 adjusts a light intensity LE at the time of reading (R3). Specifically, the controller 71 controls the light source 63a to irradiate light toward the reference member 13. Further, the controller 71 adjusts the light intensity LE of the light source 63a such that a maximum value of analog data at the time of reading the reflected light becomes a maximum value of digital data converted by the A/D conversion unit 62. Herein, the light intensity LE is determined by a turn-on time and a current value in one line of the light source 63a.

The controller 71 acquires the black data BK (R4). Specifically, the controller 71 controls the light source 63a to be turned off, controls the reading unit 63 to read one line, and stores the digital data corresponding to the read one line in the memory 72 as the black data BK. The digital data at this time is dark output.

The controller 71 acquires the white data WT (R5). Specifically, the controller 71 controls the light source 63a to be turned on at the light intensity LE, controls the reading unit 63 to read one line, and stores the digital data corresponding to the read one line in the memory 72 as the white data WT. The controller 71 sets the A/D conversion unit 62 to output the digital data to the correction unit 61, and sets the correction unit 61 to perform the shading compensation.

In a state where the reading unit 63 does not perform the reading, the controller 71 controls the movement mechanism 64 to move the reading unit 63 in the sub-scanning direction Y, and changes the reading position from the home position Y0 to the first standby position Y1 (R6). As a result, the reading position of the reading unit 63 becomes the position corresponding to the first reference corner C1 and the second reference corner C2 in the sub-scanning direction Y. Herein, the expression "the position corresponding to the first reference corner C1 and the second reference corner C2" means a position slightly shifted to the inside of the original from the position of the first reference corner C1 and the second reference corner C2 in the sub-scanning direction Y (for example, a position shifted by 3 mm to the inside from the first reference corner C1 and the second reference corner C2).

The controller 71 determines whether the cover 20 is changed from the close state to the open state (R7). Specifically, the controller 71 determines whether the cover sensor 50 is changed from the OFF state to the ON state. In a case where the cover sensor 50 is changed from the OFF state to the ON state (R7: YES), the controller 71 advances to a cover-open process (R8). In a case where the cover sensor 50 is not changed from the OFF state to the ON state (R7: NO), the controller 71 advances to a process of determining whether the start button is pressed (R9).

In R8, the controller 71 performs the cover-open process. Herein, the outline of the cover-open process (R8) will be briefly described with reference to FIG. 4. The controller 71 waits for the close state of the cover 20 or the pressing of the start button. When the cover 20 is closed (RA1: YES), the controller 71 detects both ends of a leading edge of the original document DC. The controller 71 then determines whether the original document DC is placed with respect to the first reference corner C1 or the second reference corner C2 on the basis of the detected ends of the original document DC. When the original document DC is placed with respect to the first reference corner C1 (RA6: YES), the controller 71 specifies a document size of the original document DC assuming that a document width which is a length between the detected both ends is a length of a short side of the original document DC, and sets 1 to the position flag FG. When the original document DC is placed with respect to the second reference corner C2 (RA9: YES), the controller 71 specifies the document size assuming that the document width is a length of a long side of the original document DC, and sets 1 to the position flag FG. When the original document DC is placed with respect to neither the first reference corner C1 nor the second reference corner C2 (RA9: NO), the controller 71 sets 2 to the position flag FG. In the present embodiment, the controller 71 sets 1 to the position flag FG when the original document DC is placed with respect to the first reference corner C1 or the second reference corner C2 and the document size is specified in the cover-open process (R8), and the controller 71 sets 2 to the position flag FG when the original document DC is placed with respect to neither the first reference corner C1 nor the second reference corner C2 and the document size is not specified in the cover-open process (R8). The detailed description about the cover-open process will be given later.

In R9, the controller 71 determines whether the start button is pressed. When the start button is pressed (R9: YES), the controller 71 advances to a reading process (R10). When the start button is not pressed (R9: NO), the controller 71 returns to the process of determining whether the cover 20 is changed from the close state to the open state (R7). The controller 71 waits for the close state of the cover 20 or the pressing of the start button.

In R10, the controller 71 performs the reading process. Herein, the outline of the reading process (R10) will be briefly described with reference to FIG. 5. The controller 71 determines whether the position flag FG is set to any one of 0, 1, and 2. When the position flag FG is set to 0 or 1 (RB1: 0 or 1), the controller 71 performs a forward reading after performing a process of setting for reading. When the position flag FG is set to 2 (RB1: 2), the controller 71 performs a backward reading after performing a region specifying process. When the reading process (R10) is completed, the controller 71 advances to a process of determining whether the cover 20 is changed from the close state to the open state (R7). The detailed description about the reading process will be given later.

Figure 4:
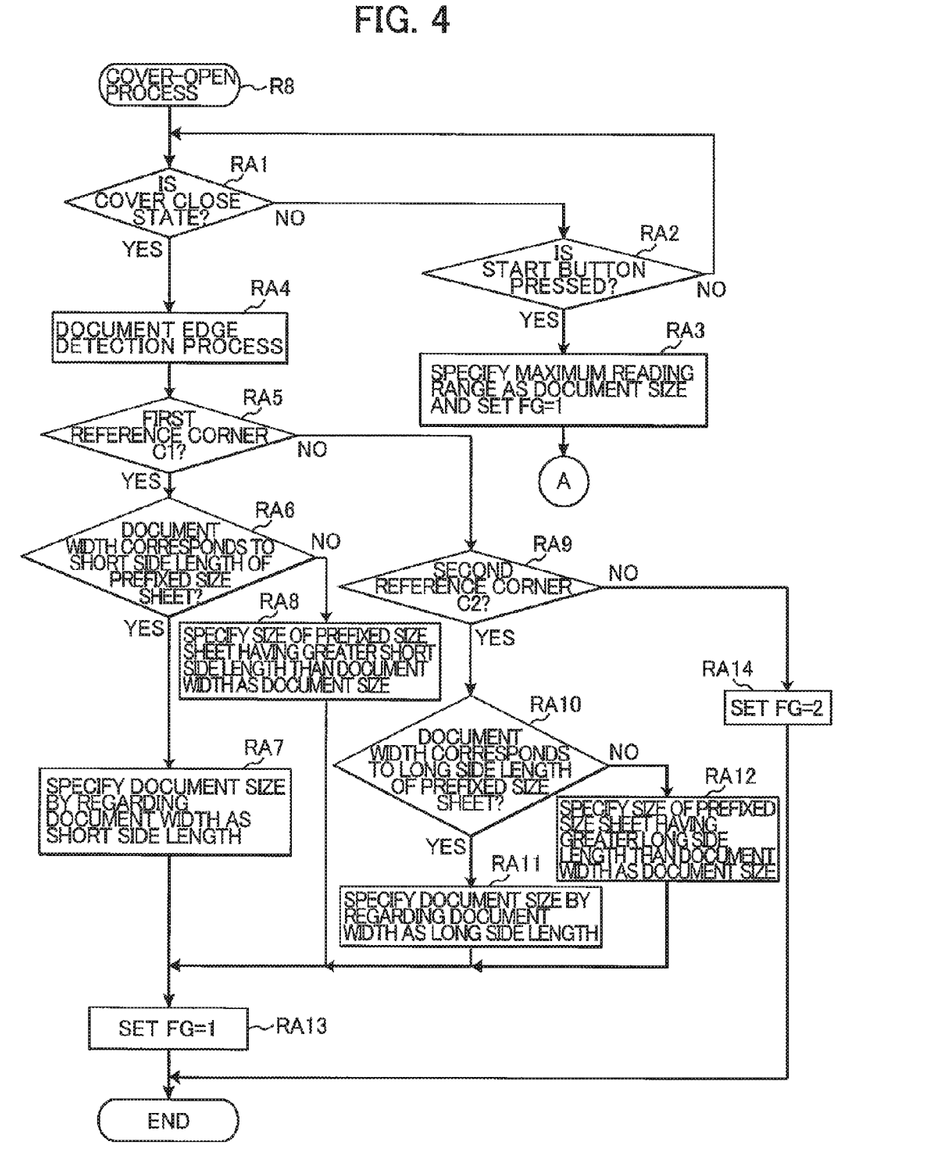
FIG. 4 is a flowchart illustrating steps in a cover-open process executed by the reading device.

Subsequently, the cover-open process (R8) will be described with reference to FIG. 4. The cover-open process (R8) is performed after the cover 20 is changed from the close state to the open state (R7: YES) in the power-on process (FIG. 3). The controller 71 first determines whether the cover 20 is in the close state (RA1). When the cover sensor 50 enters the OFF state (RA1: YES), the controller 71 advances to a document edge detection process (RA4). The detailed description about the document edge detection process will be given later. When the controller 72 determines that the cover sensor 50 does not enter the OFF state (RA1: NO), the controller 71 advances to a process of determining whether the start button is pressed (RA2). Herein, the expression "the cover 20 is in the close state" indicates that the cover sensor 50 is returned from the ON state to the OFF state, and that the angle formed between the cover 20 and the upper surface of the original table 10 becomes equal to or less than 10 degrees.

In the case that the cover 20 is not the close state (RA1: NO), the controller 71 then determines whether the start button is pressed (RA2). When the start button is pressed (RA2: YES), the controller 71 sets a maximum reading range as a document size, and sets 1 to the position flag FG (RA3). When the start button is not pressed (RA2: NO), the controller 71 returns to the process of determining whether the cover 20 is in the close state (RA1). The controller 71 waits for the close state of the cover 20 or the pressing of the start button. Herein, the maximum reading range represents a maximum range on the transparent plate 12 on which an original document DC to be read is allocable. Specifically, the maximum reading range is a rectangular area including the first reference corner C1, the second reference corner C2, and the third reference corner C3 as vertexes, that is, a range from a position corresponding to the first reference corner C1 to a position corresponding to the second reference corner C2 in the main scanning direction X and from the first standby position Y1 to the second standby position Y2 in the sub-scanning direction Y.

In RA1, when the controller 71 determines that the cover 20 is in the close state (RA1: YES), as described above, the controller 71 performs the document edge detection process for detecting both ends of a leading edge of an original document DC (RA4). Specifically, the controller 71 controls the light source 63a to be turned on at the light intensity LE, controls the reading unit 63 to read one line, and stores a gradation value of each pixel of the read one line in the memory 72 as a detection value CD. In RA4, the reading position of the reading unit 63 is the first standby position Y1. Therefore, the reading unit 63 reads one line corresponding to the first standby position Y1 in the sub-scanning direction Y, that is, pixels from the reading start pixel position X1 to the reading end pixel position X2 in the main scanning direction X. The controller 71 then retrieves a position of a pixel which has a value exceeding a predetermined threshold among the detection values CD in an order from the reading start pixel position X1 toward the downstream side in the main scanning direction X. The controller 71 stores the position of the first pixel having a value exceeding the predetermined threshold in the memory 72 as a first document edge OGE1. The controller 71 next retrieves a position of a pixel which has a value exceeding the predetermined threshold among the detection values CD in an order from the reading end pixel position X2 toward the upstream side in the main scanning direction X. The controller 71 stores the position of the first pixel having a value exceeding the predetermined threshold in the memory 72 as a second document edge OGE2. The controller 71 further stores the length between the first document edge OGE1 and the second document edge OGE2 in the memory 72 as a document width OGL. Herein, the "predetermined threshold" is, for example, an intermediate value between the values of the dark output and the white output.

In RA5, the controller 71 determines whether the first reference corner C1 is overlaid with the original document DC. When the first document edge OGE1 is at a position of a leading pixel which is the most upstream pixel in the main scanning direction X, the controller 71 determines that the first reference corner C1 is overlaid with the original document DC (RA5: YES). The controller 71 then advances to a process of determining whether the document width OGL corresponds to any one of short side lengths of prefixed size sheets (RA6). When the first document edge OGE1 is not at the position of the leading pixel, the controller 71 determines that the first reference corner C1 is not overlaid with the original document DC (RA5: NO). The controller 71 then advances to a process of determining whether the second reference corner C2 is overlaid with the original document DC (RA9). Herein, the reading start pixel position X1 is at a position shifted by 3 mm to the inside of the original document DC from the position of the first reference corner C1 in the main scanning direction X. Therefore, when the first reference corner C1 is overlaid with the original document DC, the reading result of the pixel at the reading start pixel position X1 becomes a background color of the original document DC, and the first document edge OGE1 is at the position of the leading pixel. On the other hand, when the first reference corner C1 is not overlaid with the original document DC, the reading result of the pixel at the reading start pixel position X1 becomes the dark output covered by the cover 20, and the first document edge OGE1 is not at the position of the leading pixel.

In RA6, the controller 71 determines whether the document width OGL corresponds to any one of short side lengths of prefixed size sheets. When the document width OGL corresponds to one of the short side lengths of the prefixed size sheets (RA6: YES), the controller 71 advances to a process of specifying the document size by regarding the document width OGL as the short side length of the original document DC (RA7). When the document width OGL does not correspond to any one of the short side lengths of the prefixed size sheets (RA6: NO), the controller 71 advances to a process of specifying a size of a prefixed size sheet having a greater short side length than the document width OGL as the document size (RA8). Herein, the expression "the document width OGL corresponds to one of the short side lengths of the prefixed size sheets" means that the document width OGL is one of 297 mm, 210 mm, 148 mm, and 105 mm. The size 297 mm, 210 mm, 148 mm, and 105 mm each corresponds to the short side length of the A3, A4, A5, and A6 sheets which can be placed on the document table 10 in the laterally placed state.

In RA7, the controller 71 specifies the document size by regarding the document width OGL as the short side length. Specifically, the controller 71 specifies as the document size a lateral A3 when the document width OGL is 297 mm, a lateral A4 when the document width OGL is 210 mm, a lateral A5 when the document width OGL is 148 mm, and a lateral A6 when the document width OGL is 105 mm. Each document size indicates the document position and the document size with respect to the first reference corner C1. When the process RA7 is completed, the controller 71 advances to a process of setting 1 to the position flag FG (RA13).

In RA8, the controller 71 specifies a size of a prefixed size sheet having a greater short side length than the document width OGL as the document size. Specifically, the controller 71 selects a length which is greater than the document width OGL from 297 mm, 210 mm, 148 mm, and 105 mm, and further selects the shortest one from the selected lengths. The controller 71 specifies the document size on the basis of the selected length. In other words, the controller 71 specifies as the document size the lateral A3 when the selected length is 297 mm, the lateral A4 when the selected length is 210 mm, the lateral A5 when the selected length is 148 mm, and the lateral A6 when the selected length is 105 mm. Each document size indicates the document position and the document size with respect to the first reference corner C1. When the process RA8 is completed, the controller 71 advances to the process of setting 1 to the position flag FG (RA13).

In RA5, when the first reference corner C1 is not overlaid with the original document DC (RA5: NO), the controller 71 then determines whether the second reference corner C2 is overlaid with the original document DC (RA9). When the second document edge OGE2 is at a position of a trailing pixel which is the most downstream pixel in the main scanning direction X, the controller 71 determines that the second reference corner C2 is overlaid with the original document DC (RA9: YES). The controller 71 then advances to a process of determining whether the document width OGL corresponds to any one of long side lengths of prefixed size sheets (RA10). When the second document edge OGE2 is not at the position of the trailing pixel, the controller 71 determines that the second reference corner C2 is not overlaid with the original document DC (RA9: NO). The controller 71 then advances to a process of setting 2 to the position flag FG (RA14). Herein, the reading end pixel position X2 is at a position shifted by 3 mm to the inside of the original document DC from the position of the second reference corner C2 in the main scanning direction X. Therefore, when the second reference corner C2 is overlaid with the original document DC, the reading result of the pixel at the reading end pixel position X2 becomes the background color of the original document DC, and the second document edge OGE2 is at the position of the trailing pixel. On the other hand, when the second reference corner C2 is not overlaid with the original document DC, the reading result of the pixel at the reading end pixel position X2 becomes the dark output covered by the cover 20, and the second document edge OGE2 is not at the position of the trailing pixel.

In RA10, the controller 71 determines whether the document width OGL corresponds to any one of long side lengths of prefixed size sheets. When the document width OGL corresponds to one of the long side lengths of the prefixed size sheets (RA10: YES), the controller 71 advances a process of specifying the document size by regarding the document width OGL as the long side length of the original document DC (RA11). When the document width OGL does not correspond to any one of the long side lengths of the prefixed size sheets (RA10: NO), the controller 71 advances to a process of specifying a size of a prefixed size sheet having a greater long side length than the document width OGL as the document size (RA12). Herein, the expression "the document width OGL corresponds to one of the long side lengths of the prefixed size sheets" means that the document width OGL is one of 297 mm, 210 mm, and 148 mm. The size 297 mm, 210 mm, and 148 mm each corresponds to the long side length of the A4, A5, and A6 sheets which can be placed on the document table 10 in the longitudinally placed state.

In RA11, the controller 71 specifies the document size by regarding the document width OGL as the long side length. Specifically, the controller 71 specifies as the document size a longitudinal A4 when the document width OGL is 297 mm, a longitudinal A5 when the document width OGL is 210 mm, and a longitudinal A6 when the document width OGL is 148 mm. Each document size indicates the document position and the document size with respect to the second reference corner C2. When the process RA11 is completed, the controller 71 advances to the process of setting 1 to the position flag FG (RA13).

In RA12, the controller 71 specifies a size of a prefixed size sheet having a greater long side length than the document width OGL as the document size. Specifically, the controller 71 selects a length which is greater than the document width OGL from 297 mm, 210 mm, and 148 mm, and further selects the shortest one from the selected lengths. The controller 71 specifies the original size on the basis of the selected length. In other words, the controller 71 specifies as the document size the longitudinal A4 when the selected length is 297 mm, the longitudinal A5 when the selected length is 210 mm, and the longitudinal A6 when the selected length is 148 mm. Each document size indicates the document position and the document size with respect to the second reference corner C2.

The controller 71 then sets 1 to the position flag FG (RA13). When the process RA13 is completed, the cover-open process (R8) is ended.

In RA9, when the second reference corner C2 is not overlaid with the original document DC (RA9: NO), the controller 71 sets 2 to the position flag FG (RA14). When the process RA14 is completed, the cover-open process (R8) is ended.

Figure 5:
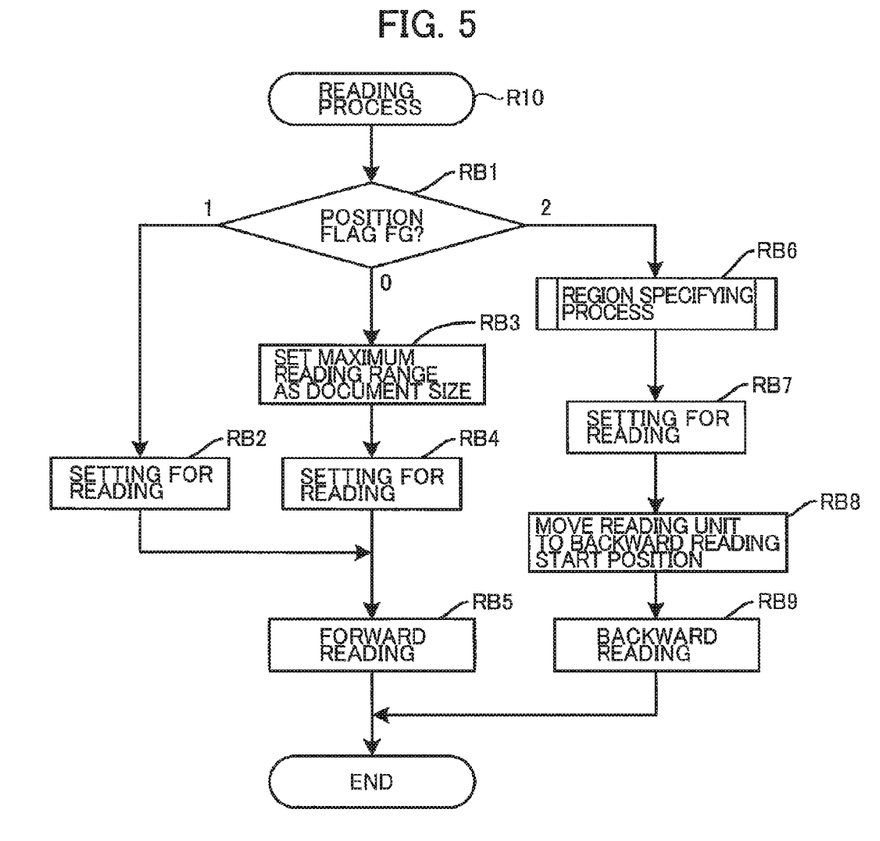
FIG. 5 is a flowchart illustrating steps in a reading process executed by the reading device.

Subsequently, the reading process (R10) will be described with reference to FIG. 5. The controller 71 first determines whether the position flag FG is 0, 1, or 2 (RB1). When the position flag FG is 0 (RB1: 0), the controller 71 advances to a process of setting the maximum reading range as the document size (RB3). When the position flag FG is 1 (RB1: 1), the controller 71 advances to a process of setting for reading (RB2). When the position flag FG is 2 (RB1: 2), the controller 71 advances to a region specifying process (RB6).

In RB1, when the position flag FG is 1 (RB1: 1), the controller 71 performs setting for reading (RB2). Specifically, when the document size corresponds to the laterally placed state, the controller 71 sets the A/D conversion unit 62 with a position corresponding to the first reference corner C1 in the main scanning direction X as the reading start pixel position X1 and a position corresponding to the downstream end of the document size in the main scanning direction X as the reading end pixel position X2. When the document size corresponds to the longitudinally placed state, the controller 71 sets the A/D conversion unit 62 with a position corresponding to the upstream end of the document size in the main scanning direction X as the reading start pixel position X1 and a position corresponding to the second reference corner C2 in the main scanning direction X as the reading end pixel position X2. When the process RB2 is completed, the procedure proceeds to a forward reading process (RB5).

In RB1, when the position flag FG is 0 (RB1: 0), the controller 71 specifies the maximum reading range as the document size (RB3). Specifically, the controller 71 specifies a range from the position corresponding to the first reference corner C1 to the position corresponding to the second reference corner C2 in the main scanning direction X and from a position corresponding to the first standby position Y1 to a position corresponding to the second standby position Y2 in the sub-scanning direction Y as the original size.

In RB4, the controller 71 then performs setting for reading. Specifically, the controller 71 sets the A/D conversion unit 62 with the position corresponding to the first reference corner C1 in the main scanning direction X as the reading start pixel position X1, and the position corresponding to the second reference corner C2 in the main scanning direction X as the reading end pixel position X2.

In RB5, the controller 71 performs the forward reading. Specifically, the controller 71 controls the reading unit 63 to read a range from the first standby position Y1 to the downstream end of the document size in the sub-scanning direction Y as a reading range. When the process RB5 is completed, the reading process (R10) is ended.

In RB1, when the position flag FG is 2 (RB1: 2), the controller 71 advances to the region specifying process (RB6). Herein, the outline of the region specifying process (RB6) will be briefly described with reference to FIG. 6. The controller 71 performs a pre-scan process on a range from the position corresponding to the first standby position Y1 to the position corresponding to the second standby position Y2 in the sub-scanning direction Y. The controller 71 then calculates continuous edge points with respect to the most upstream side and the most downstream side both in the main scanning direction X and in the sub-scanning direction Y on the basis of pre-scan image data acquired through the pre-scan process. The controller 71 further calculates a regression line based on the continuous edge points, and calculates four side edges. The controller 71 determines whether the third reference corner C3 is overlaid with the original document DC on the basis of the calculated side edges. When the third reference corner C3 is overlaid with the original document DC (RC6: YES), the controller controls the display mechanism 40 to display a region of a prefixed size sheet as a display region. When the third reference corner C3 is not overlaid with the original document DC (RC6: NO), the controller 71 controls the display mechanism 40 to display the maximum reading range as the display region. The controller 71 specifies a reading range input by the user as the document size of the original document DC. The detailed description about the region specifying process will be given later.

In RB7, the controller 71 performs setting for reading (RB7). Specifically, the controller 71 sets the A/D conversion unit 62 with the upstream end of the main scanning direction X as the reading start pixel position X1 and the downstream end of the main scanning direction X as the reading end pixel position X2 in the reading range input in RB6.

In RB8, the controller 71 controls the movement mechanism 64 to move the reading unit 63. The controller 71 changes the reading position into a backward reading start position which is the downstream end of the sub-scanning direction Y in the reading range input in RB6 (RB8).

In RB9, the controller 71 performs a backward reading process. Specifically, the controller 71 controls the reading unit 63 to read a range from the backward reading start position in the sub-scanning direction Y to the position of the upstream end in the sub-scanning direction Y in the input reading range as the reading range. When the process in RB9 is completed, the reading process (R10) is ended. Herein, the reading unit 63 moves in the forward direction, i.e., toward downstream side of the sub-scanning direction Y, to perform a pre-scan process as described later and then performs the reading while moving toward the upstream side of the sub-scanning direction Y without returning to the home position Y0. Accordingly, time required for reading can be reduced.

Figure 6:
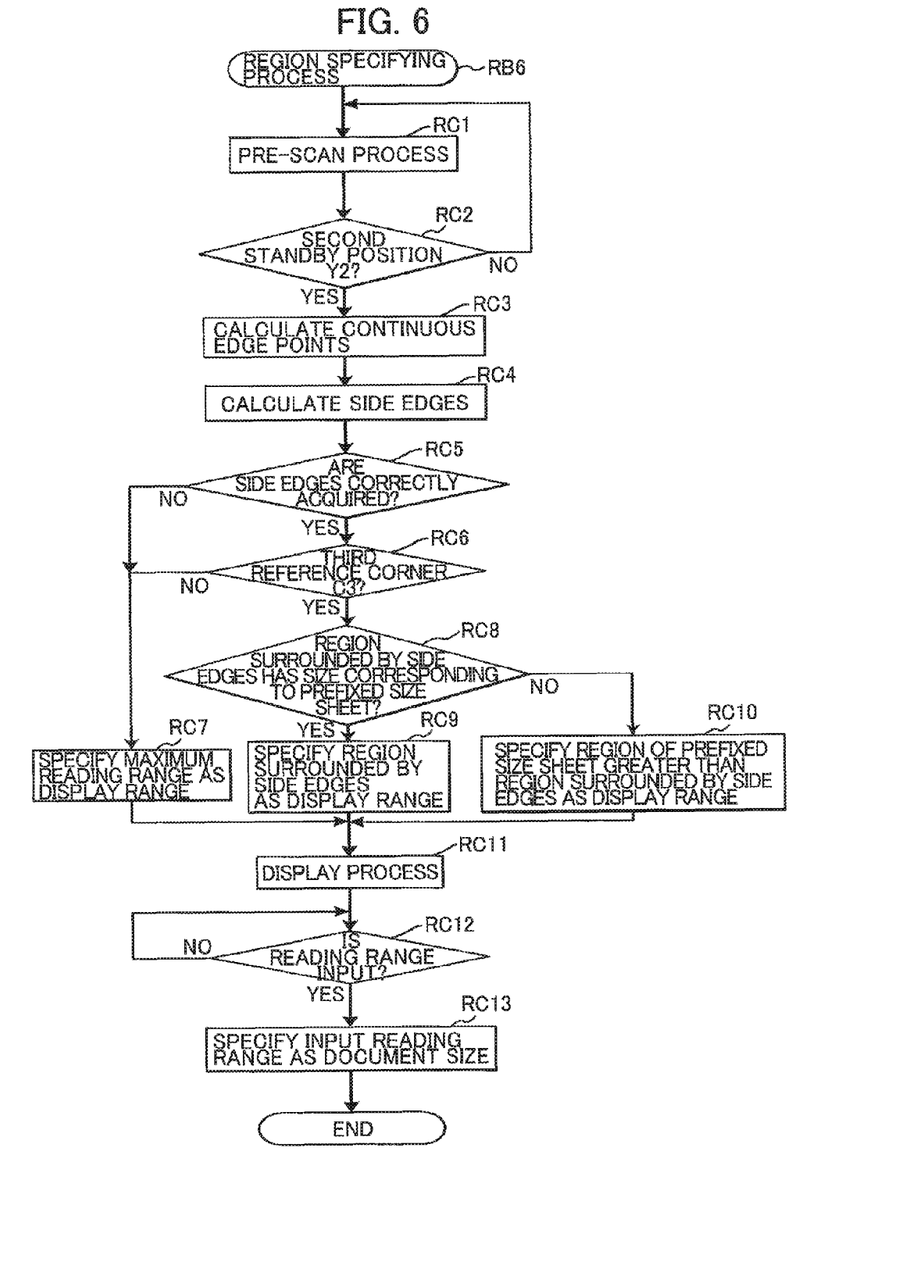
FIG. 6 is a flowchart illustrating steps in a region specifying process executed by the reading device.

Subsequently, the region specifying process (RB6) will be described with reference to FIG. 6. The controller 71 controls the reading unit 63 to perform the pre-scan process (RC1). Specifically, the controller 71 controls the reading unit 63 to perform the reading from the first standby position Y1 toward the downstream side of the sub-scanning direction Y at a reading resolution (for example, 150 dpi (dots per inch)) lower than that in a normal reading. The controller 71 stores a read image in the memory 72 as pre-scan image data.

In RC2, the controller 71 determines whether the reading unit 63 is at the second standby position Y2. When the reading unit 63 is at a position corresponding to the second standby position Y2 (RC2: YES), the controller 71 stops the movement of the reading unit 63 and controls the reading unit 63 to end the reading. When the reading unit 63 is not at the second standby position Y2 (RC2: NO), the controller 71 controls the reading unit 63 to continuously perform the reading. Herein, when the reading unit 63 is at the position corresponding to the second standby position Y2, the reading unit 63 has been controlled to perform the reading on a range from the first standby position Y1 to the second standby position Y2 in the sub-scanning direction.

The controller 71 calculates continuous edge points on the basis of the pre-scan image data (RC3). Specifically, the controller 71 generates edge image data by filtering the pre-scan image data using a well-known differential filter. The controller 71 retrieves sub-most upstream edge pixels indicating an edge on the most upstream side of the sub-scanning direction Y and sub-most downstream edge pixels indicating an edge on the most downstream side of the sub-scanning direction Y in each pixel group at every eight pixels from a main leading pixel group of the leading pixels in the main scanning direction X to a main trailing pixel group of the trailing pixels in the main scanning direction X among all the pixel rows arranged in the sub-scanning direction Y. The controller 71 determines whether peripheral pixels of the sub-most upstream edge pixels along the main scanning direction X are pixels indicating the edge. When eight continuous peripheral pixels are the pixels indicating the edge, the controller 71 calculates the sub-most upstream edge pixels as an upper-side continuous edge points. The controller 71 also determines whether peripheral pixels of the sub-most downstream edge pixels along the main scanning direction X are pixels indicating the edge. When eight continuous peripheral pixels are the pixels indicating the edge, the controller 71 calculates the sub-most downstream edge pixels as lower-side continuous edge points. The controller 71 also retrieves main most upstream edge pixels indicating an edge on the most upstream side of the main scanning direction X and main most downstream edge pixels indicating an edge on the most downstream side of the main scanning direction X in each pixel group at every eight pixels from the sub-leading pixel group of the leading pixels in the sub-scanning direction Y to the sub-trailing pixel group of the trailing pixels in the sub-scanning direction Y among all the pixel rows arranged in the main scanning direction X. The controller 71 determines whether peripheral pixels of the main most upstream edge pixels along the sub-scanning direction Y are pixels indicating the edge. When eight continuous peripheral pixels are the pixels indicating the edge, the controller 71 calculates the main most upstream edge pixels as left-side continuous edge points. The controller 71 also determines whether peripheral pixels of the main most downstream edge pixels along the sub-scanning direction Y are pixels indicating the edge. When eight continuous peripheral pixels are the pixels indicating the edge, the controller 71 calculates the main most downstream edge pixels as right-side continuous edge points. Herein, the peripheral pixels includes eight pixels including four pixels adjacent in a direction rotated by 45 degrees from the main scanning direction X and the sub-scanning direction Y of the target pixel as well as four pixels adjacent in the main scanning direction X and the sub-scanning direction Y of the target pixel.

In RC4, the controller 71 calculates side edges (RC4). Specifically, the controller 71 calculates a regression line as an upper side edge on the basis of the upper-side continuous edge points. The controller 71 also calculates a regression line as a lower side edge on the basis of the lower-side continuous edge points. The controller 71 further calculates a regression line as a left side edge on the basis of the left-side continuous edge points. The controller 71 furthermore calculates a regression line as a right side edge on the basis of the right-side continuous edge points. When a distance between the calculated upper side edge and the calculated lower side edge is within a predetermined range (for example, less than 1 mm), the controller 71 erases the upper side edge and assumes that the upper side edge cannot be calculated. Similarly, when a distance between the calculated right side edge and the calculated left side edge is within a predetermined range (for example, less than 1 mm), the controller 71 erases the right side edge and assumes that the right side edge cannot be calculated.

In RC5, the controller 71 determines whether the left side edge SE1 and the lower side edge SE2 can be correctly acquired. Specifically, the controller 71 calculates a lower side angle between the left side edge SE1 and the lower side edge SE2. The controller 71 determines whether the lower side angle is 90 degrees. When the lower side angle is 90 degrees (RC5: YES), the controller 71 advances to a process of determining whether the third reference corner C3 is overlaid with the original document DC (RC6). When the lower side angle is not 90 degrees (RC5: NO), the controller 71 advances to a process of specifying the maximum reading range as a display range (RC7). The reading device 100 in the present embodiment is configured to perform region specification reading in which the user who uses the reading device 100 selects a partial region of the original document DC and which reads selected region when neither the first reference corner C1 nor the second reference corner C2 is overlaid with the original document DC. Specifically, the reading device 100 is configured to assume a rectangular original document DC is placed on the transparent plate 12 when the third reference corner C3 is overlaid with the original document DC.

In RC6, the controller 71 determines whether the third reference corner C2 is overlaid with the original document DC. Specifically, the controller 71 calculates an upper side angle between the left side edge SE1 and the upper side edge and a right side angle between the left side edge SE1 and the right side edge. When the upper side angle is not 90 degrees and the right side angle is not 0 degree, the controller 71 determines that the third reference corner C3 is overlaid with the original document DC (RC6: YES). The controller 71 then advances to a process of determining whether the region surrounded by the side edges has a size corresponding to any one of prefixed size sheets (RC8). When the upper side angle is 90 degrees or the right side angle is 0 degree, the controller 71 determines that the third reference corner C3 is not overlaid with the original document DC (RC6: NO). The controller 71 then advances to a process of specifying the maximum reading range as the display range (RC7). When the upper side edge and the right side edge are not calculated in RC4, the controller 71 determines that the upper side angle is not 90 degrees and the right side angle is not 0 degree, that is, the third reference corner C3 is overlaid with the original document DC (RC6: YES). In the present embodiment, the reading range of the pre-scan process in RC1 is a range from the position corresponding to the first reference corner C1 to the position corresponding the second reference corner C2 in the main scanning direction X and from the position corresponding to the first standby position Y1 to the position corresponding to the second standby position Y2 in the sub-scanning direction Y. Therefore, when the rectangular original document DC is placed with respect to the third reference corner C3 as illustrated in FIG. 1B (see the original document DC3 depicted by the two-dotted chain line), the upper side and the right side of the original document DC are not included in the reading range of the pre-scan process. Thus, the upper side and the right side of the original document DC are not read in the reading of the pre-scan process RC1, and in RC4, the upper side edge and the right side edge are not calculated, or the upper side edge and the right side edge are calculated but do not correspond to the actual side edges of the original document DC. In RC6, the controller 71 determines whether the third reference corner C3 is overlaid with the original document DC on the basis of whether the upper side edge and the right side edge calculated in RC4 correspond to the actual side edges of the original document DC.

In RC7, the controller 71 specifies the maximum reading range as the display range. Specifically, the controller 71 specifies a range from the position corresponding to the first reference corner C1 to the position corresponding to the second reference corner C2 in the main scanning direction X and from the position corresponding to the first standby position Y1 in the sub-scanning direction Y to the position corresponding to the second standby position Y2 as the display range.

In RC6, when the third reference corner C3 is overlaid with the original document DC (RC6: YES), the controller 71 determines whether the region surrounded by the side edges has a size corresponding to any one of prefixed size sheets (RC8). Specifically, the controller 71 determines whether a left side distance LL between the left side edge SE1 and the second standby position Y2 in the sub-scanning direction Y corresponds to any one of side lengths of prefixed size sheets. When the left side distance LL corresponds to one of the side length of the prefixed size sheets, the controller 71 determines that the region surrounded by the side edges has a size corresponding to one of prefixed size sheets (RC8: YES). The controller 71 then advances to a process of specifying the region surrounded by the side edges as the display range (RC9). Herein, the expression "the left side distance LL corresponds to one of the side lengths of the prefixed size sheets" means that the left side distance LL is one of 420 mm, 297 mm, 210 mm, 148 mm, and 105 mm. The length 420 mm, 297 mm, 210 mm, 148 mm, and 105 mm each corresponds to the lengths in the sub-scanning direction Y of the lateral A3, the lateral A4, the longitudinal A4, the lateral A5, the longitudinal A5, the lateral A6, and the longitudinal A6 which are the sheets available to be placed on the original table 10.

In RC9, the controller 71 specifies a region surrounded by the side edges as the display range. Specifically, the controller 71 specifies a region from the position corresponding to the third reference corner C3 to the position corresponding to the lower side edge SE2 in the main scanning direction X and from the position corresponding to the left side edge SE1 to the second standby position Y2 in the sub-scanning direction Y as the display range.

In RC10, the controller 71 specifies the region of a size of a prefixed size sheet greater than the region surrounded by the edge sides as the display range. Specifically, the controller 71 selects a length which is greater than the left side distance LL from 420 mm, 297 mm, 210 mm, 148 mm, and 105 mm, and further selects a shortest one from the selected lengths. The controller 71 specifies the display range on the basis of the selected length. In other words, the controller 71 specifies as the display range the lateral A3 with respect to the third reference corner C3 when the selected length is 420 mm, the lateral A4 with respect to the third reference corner C3 when the selected length is 297 mm, the longitudinal A4 with respect to the third reference corner C3 when the selected length is 210 mm, the longitudinal A5 with respect to the third reference corner C3 when the selected length is 148 mm, and the longitudinal A6 with respect to the third reference corner C3 when the selected length is 105 mm.

In RC11, the controller 71 displays the display range in the pre-scan image data. Specifically, the controller 71 generates display data corresponding to the region of the display range specified in the pre-scan image data in any one of RC7, RC9, and RC10 by trimming segmental image data on the region of the display range out of the pre-scan image data. The controller 71 controls the display mechanism 40 to display the display data.

In RC12, the controller 71 determines whether the reading range is input. Specifically, the controller 71 determines whether the user operates the manipulation mechanism 30 to input the reading range. When the reading range is input (RC12: YES), the controller 71 advances to a process of specifying the input reading range as the document size (RC13). When the reading range is not input (RC12: NO), the controller 71 waits for the input of the reading range. The controller 71 specifies the input reading range as the document size (RC13).

In the present embodiment, the controller 71 determines in RA5 and in RA9 whether the first reference corner C1 or the second reference corner C2 is overlaid with the original document DC. When the first reference corner C1 is overlaid with the original document DC, the controller 71 determines in RA7 and in RA8 the document size assuming that the original document DC is placed in the laterally placed state. When the first reference corner C1 is not overlaid with the original document DC but the second reference corner C2 is overlaid with the original document DC, the controller 71 specifies in RA11 and in RA12 the document size assuming that the original document DC is placed in the longitudinally placed state. Therefore, the document size can be specified by changing the position with respect to which the original document DC is placed.

In the present embodiment, the controller 71 determines in RA6 and in RA10 whether the document width OGL corresponds to one of side lengths of prefixed size sheets. When the document width OGL does not correspond to any one of the side lengths of the prefixed size sheets, the controller 71 specifies in RA8 and in RA12 a size of the prefixed size sheet having the side length greater than the document width OGL as the document size. Therefore, an optimal document size can be specified.

In the present embodiment, when none of the first reference corner C1 and the second reference corner C2 is overlaid with the original document DC, the controller 71 sets 2 to the position flag FG in RA14. When the position flag FG is 2, the controller 71 performs in RB6 to RB9 the backward reading in which the reading of the reading range specified through the region specifying process is performed while moving the reading unit 63 from the second standby position Y2 to the first standby position Y1 after the pre-scan process is performed from the first standby position Y1 to the second standby position Y2. Therefore, the pre-scan process and the region specification reading process can be performed by one reciprocating movement of the reading unit 63 in the sub-scanning direction Y.

In the present embodiment, when none of the first reference corner C1 and the second reference corner C2 is overlaid with the original document DC but the third reference corner C3 is overlaid with the original document DC, the controller 71 specifies in RC9 and in RC10 a region of a size of one of prefixed size sheets as the display range. Therefore, an optical pre-scan image data can be displayed, and the reading range is easily selected.

The first reference corner C1 is an example of the claimed first reference point, the second reference corner C2 is an example of the claimed second reference point, and the third reference corner C3 is an example of the claimed third reference point. The reading device 100 is an example of the claimed reading device. The document table 10 is an example of the claimed platen, the cover 20 is an example of the claimed cover, the reading mechanism 60 is an example of the claimed reading unit, the display mechanism 40 is an example of the claimed display, and the controller 71 is an example of the claimed controller.

[Modification]

While the description has been made in detail with reference to specific embodiment thereof, it would be apparent to those skilled in the art that various changes and modifications may be made therein without departing from the spirit and scope of the above described embodiment.

(1) For example, the reading device 100 of the embodiment may be applied to a multifunction peripheral which includes a printer unit.

(2) Further, the reading mechanism 60 of the embodiment may be configured such that a charge coupled device (CCD) is fixed and a mirror is movably provided. In this case, the "reading position" is not the position of the image sensor but the position of the mirror.

(3) In the embodiment, the controller 71 determines in RA5 the first reference corner C1 using the leading pixel, however, the reading range may be widely set and the edges of the original document may be directly detected. In addition, the controller 71 determines in RA9 the second reference corner C2 using the trailing pixel, however, the reading range may be widely set and the edges of the original document may be directly detected.

(4) In the embodiment, the controller 71 determines in RC5 whether the side edges can be normally detected on the basis of the angle formed between the left side edge SE1 and the lower side edge SE2. However, the angle between other side edges may be used, and the controller 71 may determine whether the side edges can be normally detected on the basis of the position and the length of the side edge.

(5) In the embodiment, the maximum reading range is specified as the document size in RA3 and RB3 and specified as the display range in RC7. However, alternative predetermined reading range may be used, or a specific reading range may be previously set by the user.

What is claimed is:

1. A reading device comprising:
   a platen including a first reference point, a second reference point, and a third reference point;
   a cover movable between an open position and a closed position, the platen being exposed when the cover is at the open position, the platen being covered by the cover when the cover is at the closed position;
   a reading unit configured to read an original document placed on the platen on a line-to-line basis in a main scanning direction while the reading unit is moving in a sub-scanning direction; and
   a controller configured to:
   (a) control the reading unit to read one line worth of data in the main scanning direction when the cover is moved from the open position to the closed position with the original document being placed on the platen, the one line including the first reference point and the second reference point;
   (b) determine whether or not the first reference point is overlaid with the original document;
   (c) in response to determining in (b) that the first reference point is overlaid with the original document, determine a first length of the original document in the main scanning direction based on the one line worth of data read by the reading unit;
   (d) specify a particular size of the original document such that the first length is a short side length of a prefixed sheet in the particular size; and
   (e) control the reading unit to read a range of the particular size of the original document.

2. The reading device according to claim 1, the controller is further configured to:
   (f) in response to determining in (b) that the first reference point is not overlaid with the original document, determine whether or not the second reference point is overlaid with the original document;
   (g) in response to determining in (f) that the second reference point is overlaid with the original document, determine a second length of the original document in the main scanning direction based on the one line worth of data read by the reading unit; and
   (h) specify the particular size of the original document such that the second length is a long side length of a prefixed sheet in the particular size.

3. The reading device according to claim 2, wherein among one or more prefixed sheets having a long side length equal to or greater than the second length determined in (g), a prefixed sheet having a long side length closest to the second length determined in (g) is specified as being the prefixed sheet in the particular size.

4. The reading device according to claim 2, further comprising a display,
   wherein the controller is further configured to:
   (i) in response to determining in (f) that the second reference point is not overlaid with the original document, control the reading unit to pre-scan the entire original document over the platen with a first resolution and to output pre-scan data;
   (j) generate display data based on the pre-scan data obtained in (i);
   (k) control the display to display an image based on the display data;
   (l) specify a scan range of the original document by receiving a designation of the scan range while displaying the image on the display; and
   (m) control the reading unit to read the scan range of the original document with a second resolution, wherein the second resolution is greater than the first resolution.

5. The reading device according to claim 4, wherein the controller is further configured to:
   (n) determine whether or not the third reference point is overlaid with the original document;
   (o) in response to determining in (n) that the third reference point is overlaid with the original document, specify a scan range of the original document according to the designation that the scan range is a size of a prefixed sheet;
   (p) trim segmental image data on the scan range out of the pre-scan data; and
   (q) control the display to display an image based on the segmental image data.

6. The reading device according to claim 5, wherein the controller is further configured to:
   (r) convert the pre-scan data into edge image data representative of edges of the original document;

(s) calculate a region defined by a plurality of line segments based on the edge image data, the region being a polygonal region surrounded by the plurality of line segments; and (t) specify the particular size of the original document based on the region calculated in (s), wherein among one or more prefixed sheets having a size equal to or greater than the region calculated in (s), a prefixed sheet having a size closest to the region calculated in (s) is specified as being the prefixed sheet in the particular size.

7. The reading device according to claim 6, wherein the controller is further configured to:

(u) calculate the plurality of line segments by extracting a plurality of edge points from the edge image data and calculating a plurality of regression lines based on the plurality of edge points.

8. The reading device according to claim 1, wherein among one or more prefixed sheets having a short side length equal to or greater than the first length determined in (c), a prefixed sheet having a short side length closest to the first length determined in (c) is specified as being the prefixed sheet in the particular size.

9. The reading device according to claim 1, wherein the platen has four corners including a first corner, a second corner located at a position different in the main scanning direction from the first corner but same in the sub-scanning direction as the first corner, and a third corner located at a position different in the sub-scanning direction from the first corner and the second corner but same in the main scanning direction as one of the first corner and the second corner, the first reference point is set on the first corner, the second reference point is set on the second corner, and the third reference point is set on the third corner.

10. A reading device comprising:
a platen including a first reference point, a second reference point, and a third reference point;
a cover movable between an open position and a closed position, the platen being exposed when the cover is at the open position, the platen being covered by the cover when the cover is at the closed position;
a reading unit configured to read an original document placed on the platen on a line-to-line basis in a main scanning direction while the reading unit is moving in a sub-scanning direction; and
a controller configured to:
(a) control the reading unit to read one line worth of data in the main scanning direction when the cover is moved from the open position to the closed position with the original document being placed on the platen, the one line including the first reference point and the second reference point;
(b) determine whether or not the first reference point is overlaid with the original document;
(c) in response to determining in (b) that the first reference point is overlaid with the original document, determine a first length of the original document in the main scanning direction based on the one line worth of data read by the reading unit;
(d) specify a particular size of the original document such that the first length is a long side length of a prefixed sheet in the particular size; and
(e) control the reading unit to read a range of the particular size of the original document.

* * * * *